UNITED STATES PATENT OFFICE.

JENS HENRIK HJALMAR JACOBSEN, OF HERLOEV, DENMARK.

METHOD OF MANUFACTURING RADIO-ACTIVE MINERAL-WATER SALTS.

1,253,830.      Specification of Letters Patent.      Patented Jan. 15, 1918.

No Drawing.      Application filed May 8, 1915. Serial No. 26,765.

*To all whom it may concern:*

Be it known that I, JENS HENRIK HJALMAR JACOBSEN, pharmacist, a citizen of the Kingdom of Denmark, and resident of Herloev, in the Kingdom of Denmark, (whose post-office address is Herloev, Denmark,) have invented certain new and useful Improvements in Methods of Manufacturing Radio-Active Mineral-Water Salts; and I do hereby declare the following to be a full, clear, and exact description of the invention, such as will enable others skilled in the art to which it appertains to make and use the same.

The natural mineral-water salts on the market which are derived from springs are not radio-active, because the radio-activity, which is due to emanation from insoluble radium compounds in the interior of the earth, disappears by the process of evaporation, and there is some difficulty connected with imparting radio-activity to these salts in such a manner that they will retain this property permanently and constantly. This also applies to the artificial mineral-water salts. In order that the radio-activity may be permanent, it is necessary that the salt contains compounds of radio-active metals (radium, actinium, etc.) but as the relative quantity of these metals is infinitely small, they must not only be comminuted exceedingly fine and thoroughly distributed, but this distribution must be extremely even, for otherwise great portions of the salt mixture treated will be absolutely free from the radio-active substance while other portions will be too rich in this substance. This exceedingly fine comminution and even distribution of the radio-active substance throughout the salt is counteracted by its content of radium-precipitating acid (sulfuric acid).

According to this invention, artificial mineral-water salts are imparted a permanent and evenly distributed radio-activity in the following manner, to wit: The radio-active substance either pure or in mixture with one or more of the ingredients of the mineral-water salt, is subjected to a very through mechanical mixing or comminution process together with the mineral-water salt or certain of its ingredients, said mixture or comminuting being accomplished by means of suitable mixing-apparatus and eventually in several stages, with the exclusion of all dampness. No matter whether the radio-active substance is present as a soluble or as an insoluble compound, it will be distributed throughout this salt by means of this treatment with extreme evenness, so that every little particle of it shows the presence of the quantity of radio-activity determined by the dosing of the radio-active substance (measured in millicuries or Mache-units).

*Example.*

A certain quantity of radio-active substance, for instance radium bromid, is dissolved in a certain solution of the ingredient or ingredients of the mineral-water salt not containing radium-precipitating acids. The solution is evaporated to dryness, and the dry salt is subjected to the aforesaid mixing-process together with the other ingredients of the mineral-water salt. None of these should contain water of crystallization, and the salt should be kept in a dry place.

I claim:—

1. The method of producing soluble radio-active medicinal salts, which comprises forming a solution of a radium salt and another salt which does not precipitate radium, and evaporating to dryness, said salts being free from water of crystallization.

2. The method of producing permanent soluble radio-active medicinal salts of mineral waters, which comprises forming an aqueous solution of a radium salt and a salt of the mineral water that does not precipitate radium, evaporating to dryness, the resulting product being freed from water of crystallization, pulverizing the salt with the other salt constituents of the mineral water, and keeping the mixture dry.

In testimony that I claim the foregoing as my invention, I have signed my name in presence of two subscribing witnesses.

JENS HENRIK HJALMAR JACOBSEN.

Witnesses:
    L. HOFMAN BANZ,
    ERNEST BOUTARD.